United States Patent Office 2,986,484
Patented May 30, 1961

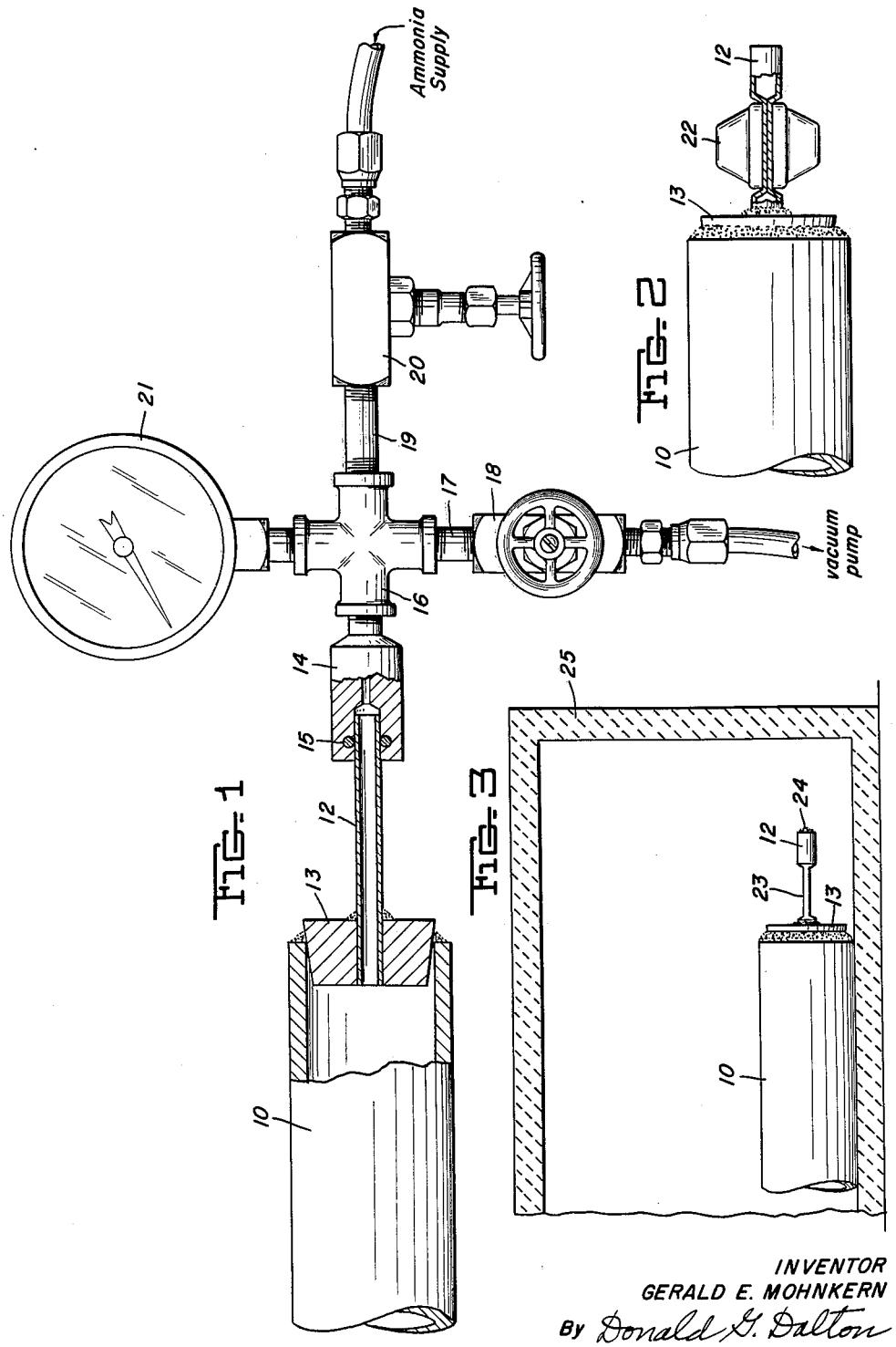

2,986,484
METHOD OF CONFINING GAS WITHIN A CHAMBER

Gerald E. Mohnkern, Oil City, Pa., assignor to United States Steel Corporation, a corporation of New Jersey Filed Mar. 18, 1959, Ser. No. 800,216

1 Claim. (Cl. 148—16.6)

This invention relates to an improved method of confining gas within a chamber.

The invention is particularly useful for confining an ammonia charge within a chamber for pressure-nitriding, as disclosed and claimed in my joint patent with Roy L. Chenault, No. 2,779,697, dated January 29, 1957. According to the patent a predetermined mass of ammonia is charged into a chamber from an external source, and the chamber is sealed and heated to a temperature of about 800° to 1200° F. for a prolonged period. The chamber can be a tube whose inside surface is to be nitrided, or else parts can be placed within the chamber for nitriding. Normally the ammonia supply is disconnected after the chamber is charged, and the patent shows the chamber equipped with a valve for thereafter confining the charge. I have observed that valves leak if heated to nitriding temperatures, and consequently have found it necessary to locate the valve away from the heated portion of the chamber. When a tube is nitrided in a continuous furnace, it is desirable to rotate the tube to prevent its sagging; valves protrude and thus interfere with such rotation. Nevertheless the invention is not limited to its application in nitriding, but may be used for confining other gases where analogous problems are encountered.

An object of the invention is to provide an improved method of confining a gas charge within a chamber, which method overcomes the need for a valve installed on the chamber.

A more specific object is to provide an improved method of confining gas within a chamber in which a section of thin-walled steel tubing is welded to an end of the chamber for exhausting air and charging gas from an external source, the tubing is pinched to close the chamber temporarily, and the tubing is welded shut to seal it throughout subsequent processing.

A further object, as applied to nitriding, is to provide an improved method of heating an ammonia-filled chamber in which the chamber is charged with ammonia from an external source and sealed, and the entire chamber is heated to a nitriding temperature.

In the drawing:

Figure 1 is a side elevational view, partly in section, of an end portion of a chamber undergoing charging preparatory to sealing in accordance with my invention;

Figure 2 is a side elevational view partly in section, showing how the chamber is closed temporarily while a welding operation takes place; and Figure 3 is a diagrammatic vertical sectional view of a portion of a furnace which contains a gas-filled chamber prepared in accordance with my invention.

Figure 1 shows the end portion of a chamber 10, for example a tube whose inside surface is to be nitrided with a confined ammonia charge. A short length 12 of thin-walled steel tubing is welded in a plug 13, which is then welded into the end of the chamber. A fitting 14, which contains an O-type sealing ring 15, is slipped over the end of the tubing 12. This fitting leads to one arm of a cross 16. A pipe 17 containing a valve 18 is connected to a second arm of the cross and leads to a conventional vacuum pump, not shown. A pipe 19 containing a valve 20 is connected to a third arm of the cross and leads to an external gas supply, for example ammonia. A pressure gage 21 is connected to the fourth arm of the cross. With the parts thus assembled, valve 18 is opened and valve 20 closed and the vacuum pump operated to exhaust air from the chamber. Next valve 18 is closed and valve 20 opened and ammonia or other gas charged to the chamber from the external supply. The pressure gage 21 furnishes an indication which tells when the desired mass has been charged. At this time valve 20 again is closed.

Next tubing 12 is pinched together with a suitable clamping tool 22 to furnish a temporary seal for the chamber, as shown in Figure 2. The fitting 14 is removed from tubing 12 and the end of the tubing is welded shut. As long as the tool 22 is in place, there is no elevated pressure at the end of the tubing as would interfere with the welding operation. Finally the tool 22 is removed. The tool leaves a constriction 23 in the tubing (Figure 3), but the walls spring apart to an extent that the constriction would not afford a seal. The weld 24 at the end of the tubing furnishes the seal which confines the gas charge until the chamber is opened intentionally.

When the chamber is placed within a furnace 25, as shown in Figure 3, the entire chamber is housed within the heated portion of the furnace. There are no valves which are subject to leaking when heated, or which interfere with proper handling of the chamber.

While I have shown and described only a single embodiment of my invention, it is apparent that modifications may arise. Therefore, I do not wish to be limited to the disclosure set forth but only by the scope of the appended claim.

I claim:

In a nitriding process in which a regulated quantity of ammonia is confined within a tubular metal chamber and the chamber is heated to an elevated temperature to nitride a surface within said chamber, an improved method of confining the ammonia within the chamber comprising welding in an end of the chamber a plug which has a length of thin-walled metal tubing extending therefrom, applying a removable fitting to the free end of said tubing, exhausting air from the chamber and charging ammonia thereto from an external source via said fitting and tubing, pinching said tubing shut between said fitting and said plug to close the chamber temporarily, removing said fitting, welding the free end of said tubing shut to afford a seal effective throughout the process, and releasing said tubing.

References Cited in the file of this patent

UNITED STATES PATENTS 2,596,981    Chenault et al. _____ May 20, 1952